Figure 1:
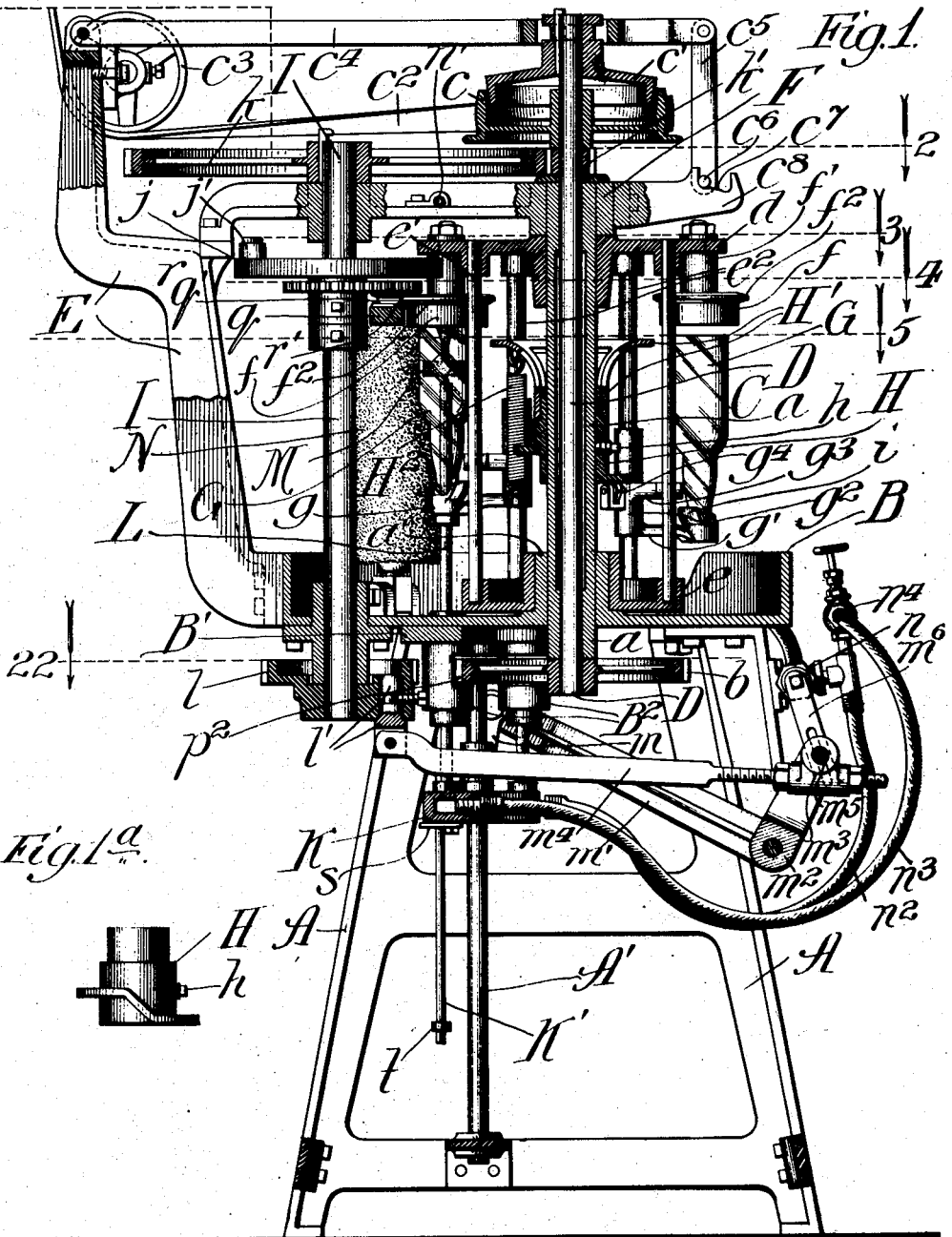
Figure 2:
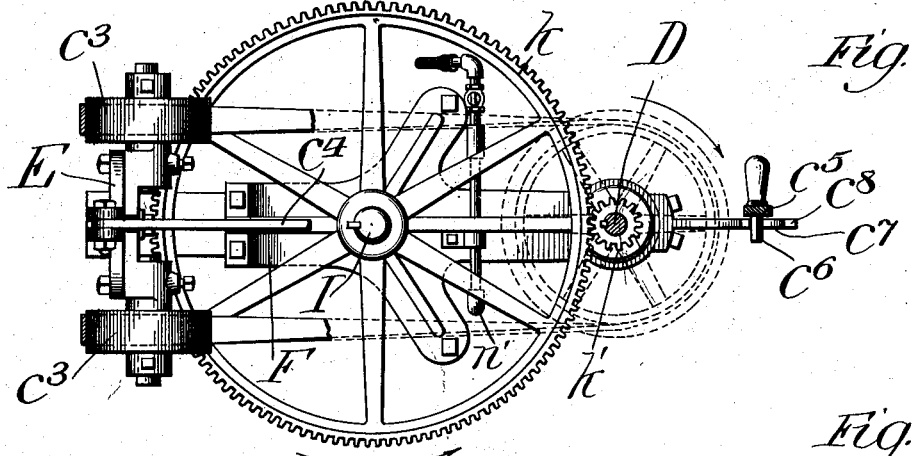

No. 827,388. PATENTED JULY 31, 1906.
J. T. H. PAUL.
BOTTLE WASHER.
APPLICATION FILED JULY 17, 1905.

8 SHEETS—SHEET 2.

Witnesses:
Inventor:
John T. H. Paul,
By Dyrenforth, Dyrenforth &c,
Attys.

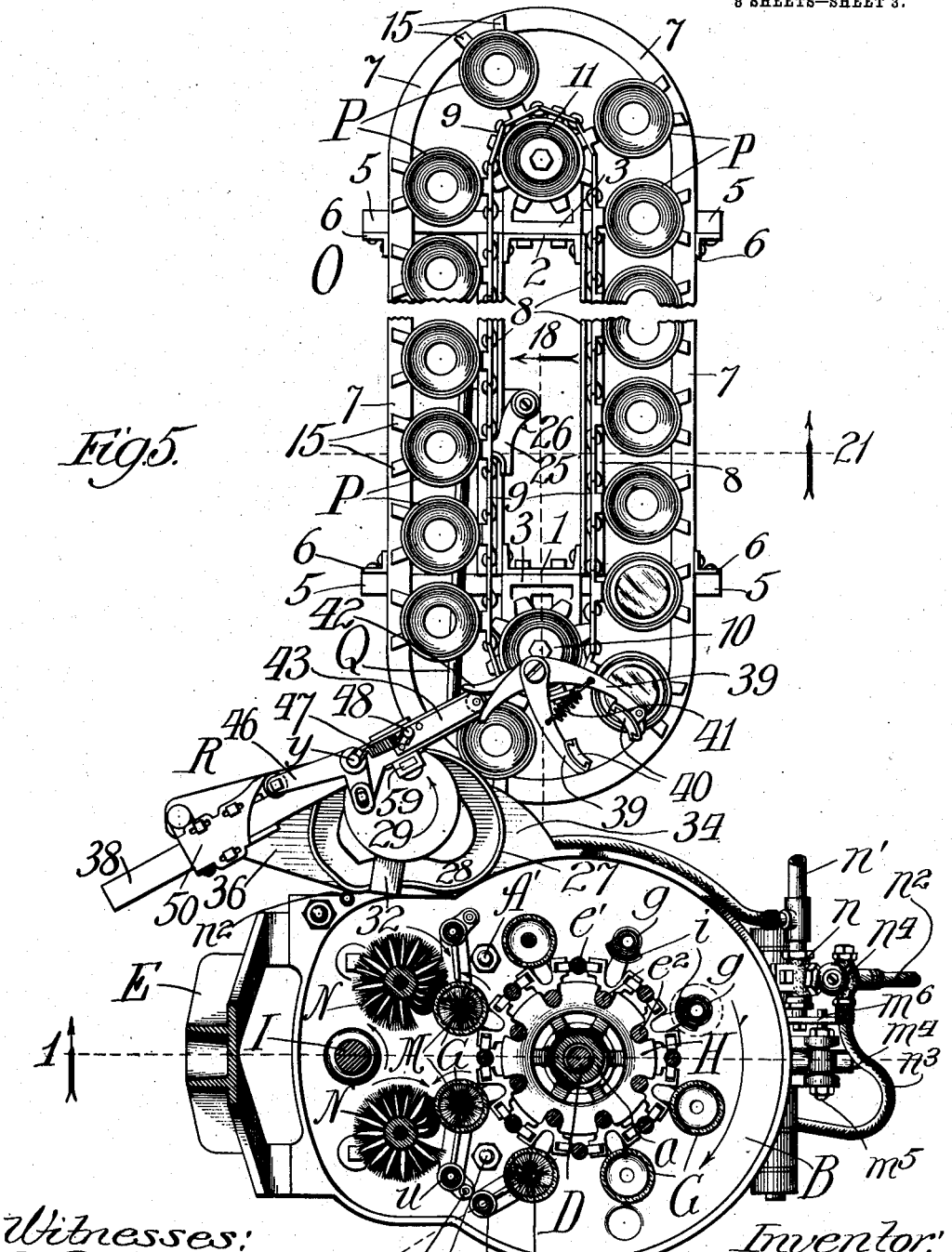

No. 827,388. PATENTED JULY 31, 1906.
J. T. H. PAUL.
BOTTLE WASHER.
APPLICATION FILED JULY 17, 1905.
8 SHEETS—SHEET 4.
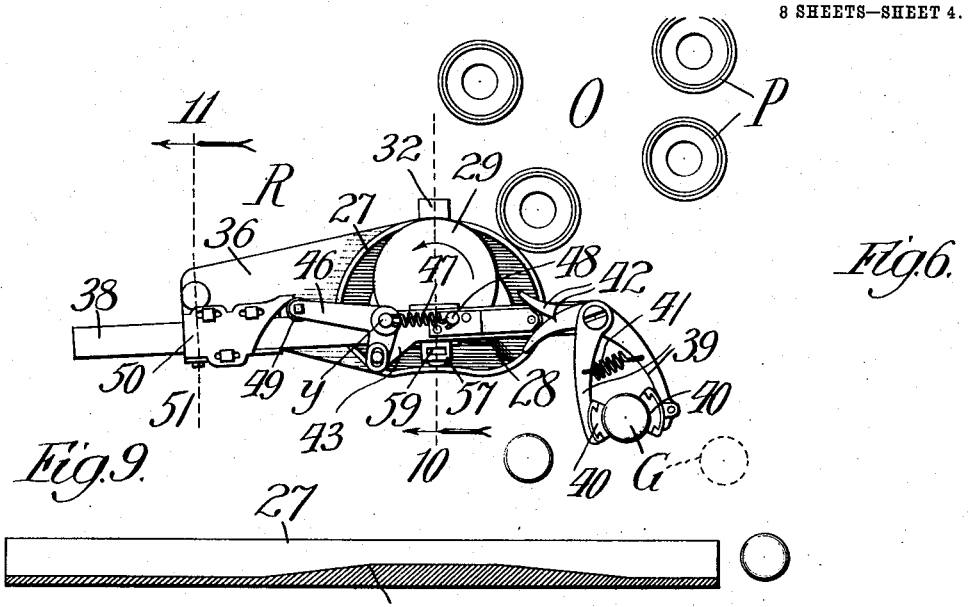
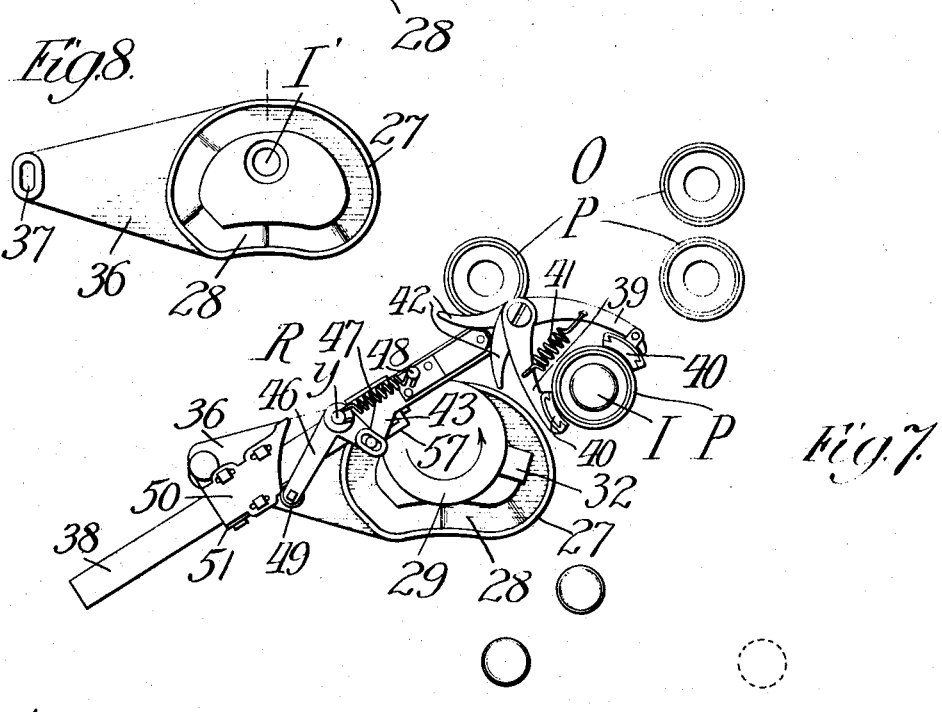
Witnesses:
Inventor:
John T. H. Paul.

No. 827,388. PATENTED JULY 31, 1906.
J. T. H. PAUL.
BOTTLE WASHER.
APPLICATION FILED JULY 17, 1905.
8 SHEETS—SHEET 5.
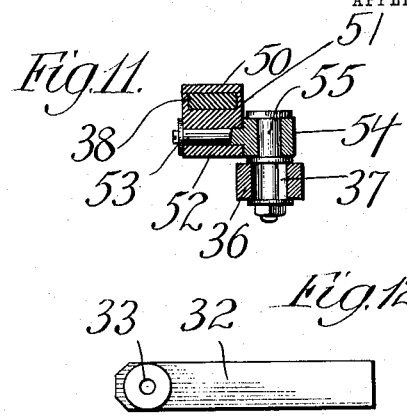
Fig. 11.
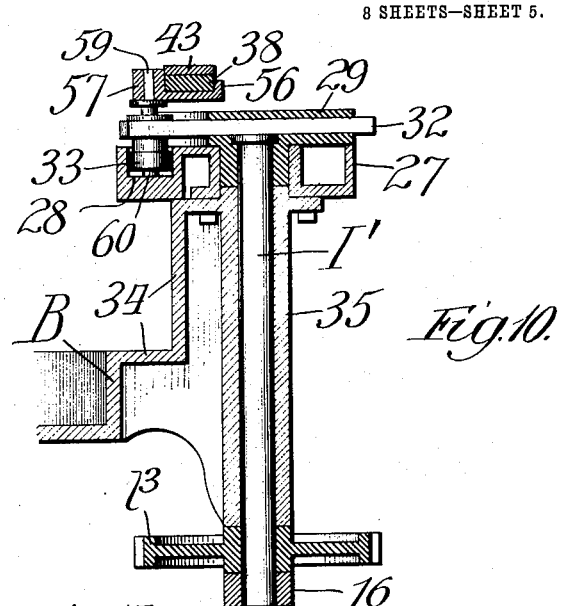
Fig. 10.
Fig. 12.
Fig. 13.
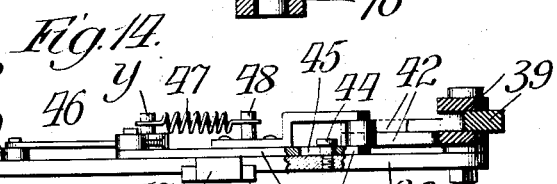
Fig. 14.
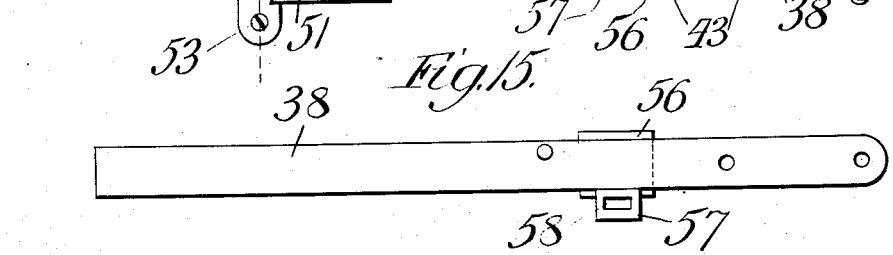
Fig. 15.
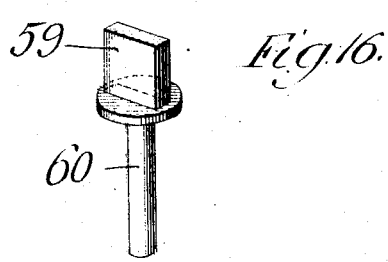
Fig. 16.
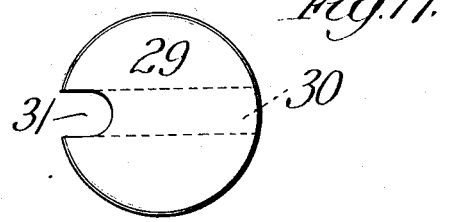
Fig. 17.
Witnesses:
Inventor:
John T. H. Paul.

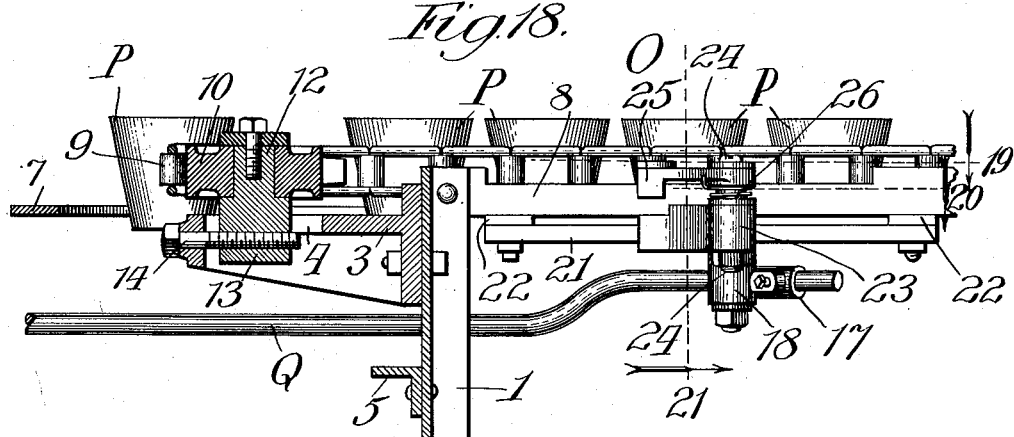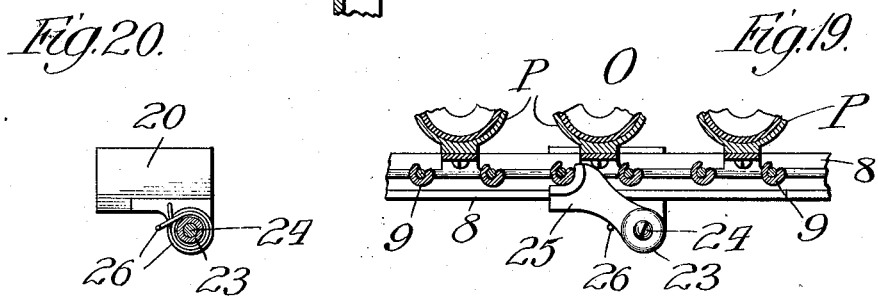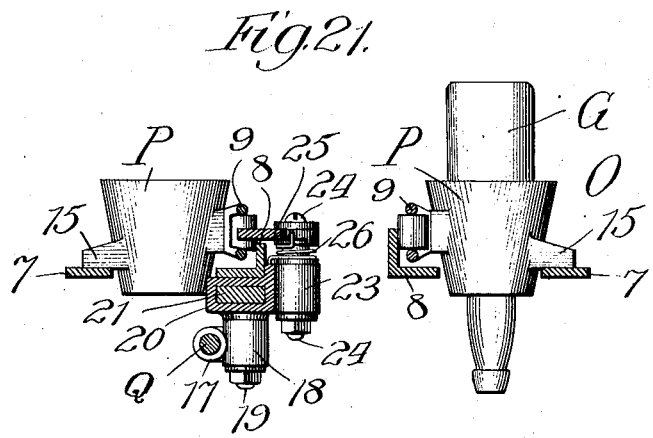

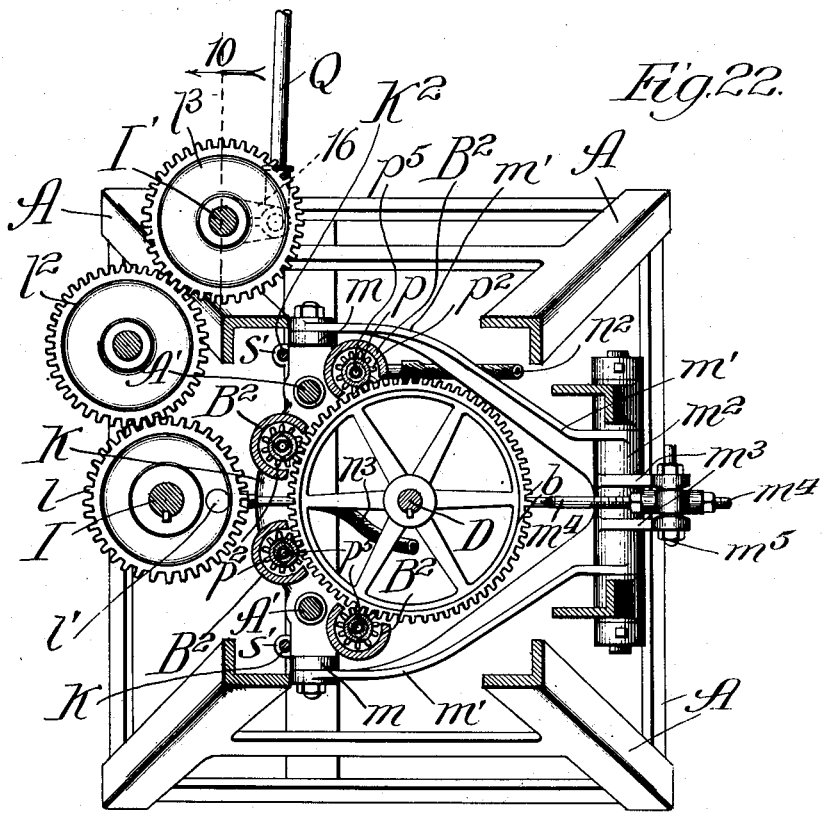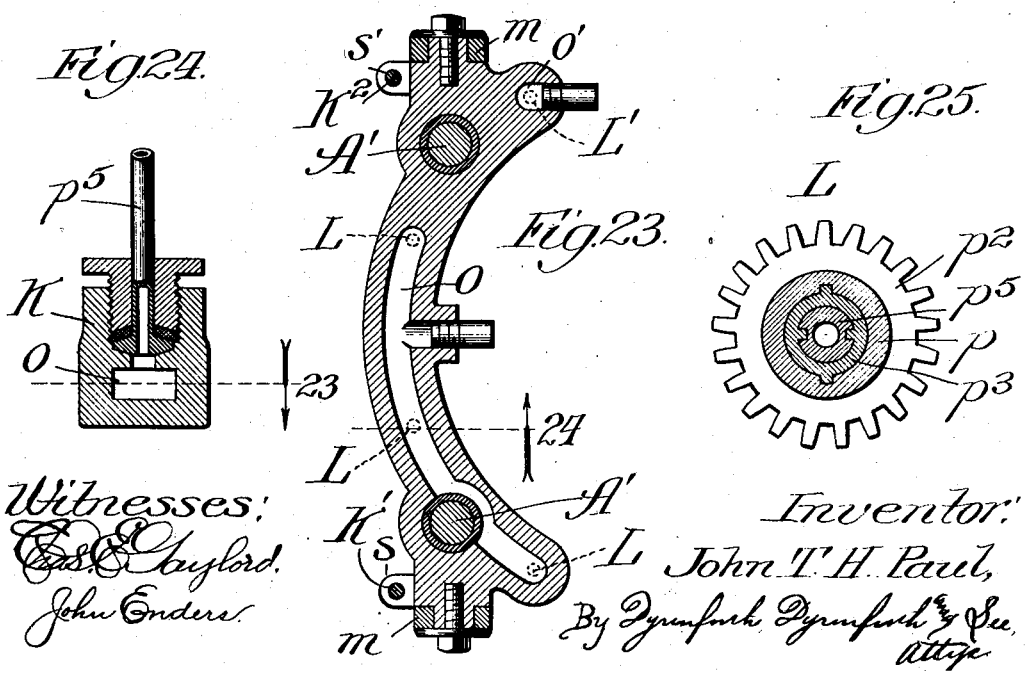

No. 827,388. PATENTED JULY 31, 1906.
J. T. H. PAUL.
BOTTLE WASHER.
APPLICATION FILED JULY 17, 1905.
8 SHEETS—SHEET 8.
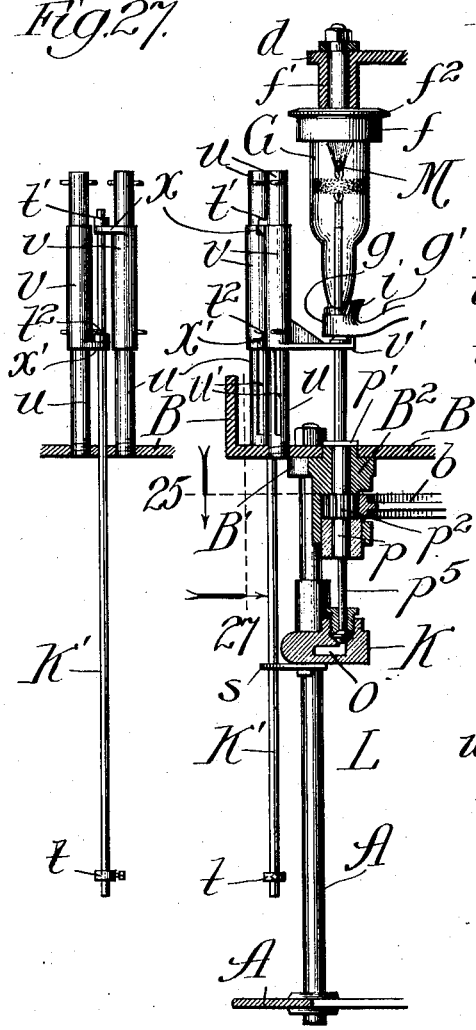
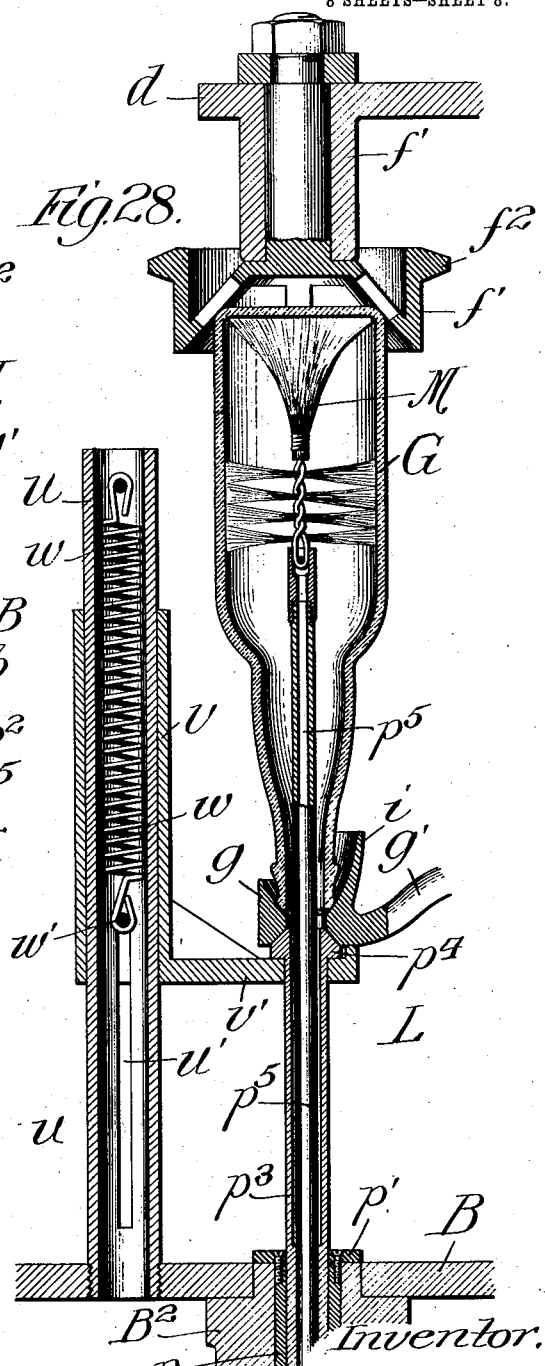
Witnesses:
Inventor:
John T. H. Paul,

UNITED STATES PATENT OFFICE.

JOHN T. H. PAUL, OF CHICAGO, ILLINOIS, ASSIGNOR TO E. GOLDMAN & COMPANY, OF CHICAGO, ILLINOIS, A CORPORATION OF ILLINOIS.

BOTTLE-WASHER.

No. 827,388.    Specification of Letters Patent.    Patented July 31, 1906.

Application filed July 17, 1905. Serial No. 269,997.

*To all whom it may concern:*

Be it known that I, JOHN T. H. PAUL, a citizen of the United States, residing at Chicago, in the county of Cook and State of Illinois, have invented a new and useful Improvement in Bottle-Washers, of which the following is a specification.

This invention relates to improvements in the type of machine for automatically washing bottles to prepare them for filling or refilling, employing a base frame or stand surmounted by a drip-pan, from within which rises a rotatable bottle-rack equipped with spring-pressed clamping-holders, in which the bottles are releasably supported neck downward; rotatable brushes for scouring the bottles externally and vertically reciprocating scouring-brush and rinsing devices for scouring and rinsing them internally with water supplied through the stems of the said devices, and driving means for turning the rack with an intermittent step-by-step movement to bring the bottles successively into position to be scoured and rinsed and for actuating the brushes and rinsing medium, the rack-actuating means also controlling a valve through which the washing-water is supplied and the opening or separation of the clamping-holders in opposition to their controlling-springs to release the bottles for their removal from the machine after being cleansed and to permit the insertion of other bottles to be washed.

The primary object of the present improvement is to render automatic the delivery from the machine of the bottles after they have been cleansed.

Further objects are to improve the operation of the reciprocating internal scouring-brushes, to facilitate adjustment for different-sized bottles of their clamping-holders without varying the tension of the springs which exert the clamping-pressure, and to insure proper guidance into the lower clamping member of each holder and retention in place therein of the bottle at its neck.

While the improvements thus referred to relate only to a delivery attachment coöperating with the rotating rack and to parts belonging to the machine, which is of known general construction, in order that the performance by the said improvements of their several functions may be clearly understood it is necessary to illustrate all the parts of the machine, and this is done in the accompanying drawings, in which—

Figure 1 shows the machine by a view in sectional elevation, the section being taken at the line 1 on Fig. 5 and viewed in the direction of the arrow. Fig. 1ª is a view in elevation of the cam for separating the clamps to release the bottles. Figs. 2, 3, 4, and 5 are sections taken, respectively, at the lines 2, 3, 4, and 5 on Fig. 1 and viewed as indicated by the arrows. Fig. 6 is a plan view, in the nature of a diagram, showing the delivery device in its condition of gripping a bottle preparatory to transferring it to a conveyer; Fig. 7, a similar view showing the delivery device in the act of depositing the bottle upon the conveyer; Fig. 8, a plan view of the principal cam for controlling the operations of the delivery device; Fig. 9, a sectional developed view of said cam; Fig. 10, an enlarged section taken at the line 10 on Fig. 6 and viewed in the direction of the arrow; Fig. 11, a similar section taken at the line 11 on either of Figs. 6 and 14 and viewed as indicated by the arrow; Fig. 12, a plan view of the reciprocating bar member of the delivery device which immediately engages the said cam; Fig. 13, a view of the same in side elevation, partly sectional; Fig. 14, a view in side elevation, partly sectional, of the delivery device; Fig. 15, a plan view of the longitudinally-reciprocating jaw-actuating bar member of the delivery device, carrying a socket-head; Fig. 16, a perspective view of the headed-pin detail which connects said socket member with the bar of Fig. 12; Fig. 17, a plan view of the disk in which said last-named bar reciprocates; Fig. 18, an enlarged section taken at the line 18 on Fig. 5 and viewed in the direction of the arrow; Figs. 19 and 20, similar sections taken, respectively, at the lines 19 and 20 on Fig. 18 and viewed as indicated by the arrows, showing details of the conveyer; Fig. 21, a section taken at the line 21 on Fig. 5 or Fig. 18 and viewed as indicated by the arrow; Fig. 22, a section taken at the line 22 on Fig. 1 and viewed in the direction of the arrow; Fig. 23, an enlarged plan section of the cross-head, taken at the line 23 on Fig. 24 and viewed in the direction of the arrow; Fig. 24, an enlarged section through the cross-head at the line 24 on Fig. 23 and viewed in the direction of the arrow; Fig. 25, an enlarged plan section of the brush-spindle-actuating pinion, taken at the line 25 on Fig. 26 and viewed in the direction of the arrow; Fig. 26, an enlarged section in the nature of a diagram, taken at the line 26 on Fig. 5 and viewed in the direction of the arrow; Fig. 27, a section taken at the line 27 on Fig. 26 and viewed in the direction of the arrow; and Fig. 28, a sectional view showing, on a large scale, the brush-spindle-holding device illustrated in Fig. 26.

A is the stand surmounted by the pan B, in which is supported the rotatable bottle-rack C, the construction of which is hereinafter described.

A stationary sleeve $a$ is supported vertically by being driven through or otherwise rigidly secured in a bearing $a'$, rising about an opening in the base of the pan. In this sleeve is journaled a vertical shaft D, carrying on its lower end a cog-wheel $b$. Any suitable means may be provided for driving this shaft. The means for this purpose employed and illustrated consist of an internal friction-pulley $c$, loosely mounted on the shaft near its upper end, and a friction-head $c'$, slidably mounted on the upper end of the shaft to rotate with it, the pulley having a belt connection $c^2$ passing to a drive-shaft (not shown) about pulleys $c^3$, journaled in bearings on a bracket E, extending from a side of the pan B, from which the head $c'$ is supported on a lever $c^4$, having a link $c^5$ depending from its free end and equipped at its lower end with a stud $c^6$ to engage the cam-surface $c^7$ on a rigid arm $c^8$, projecting from a horizontal frame member F, through which the sleeve $a$ passes. By moving the stud $c^6$ to the lower part of the cam $c^7$ the head $c'$ is lowered into engagement with the pulley $c$ to connect the shaft D with the driving-power, and to arrest the operation of the machine the stud $c^6$ is raised to the position represented in Fig. 1, whereby the head $c'$ is lifted out of engagement with the pulley $c$. The rack C has a lower head $e$ journaled upon the bearing $a'$ and an upper disk-like head $d$ journaled centrally upon the sleeve $a$ and provided in its edge with a circumferential series of notches or recesses $d'$ at equal intervals apart. Vertical rods $e'$ rigidly connect the two rack-heads, and similar rods $e^2$ extend between the heads inside the circle described by the rods $e'$ and in staggered relation thereto.

Each bottle-clamp consists of a perforate upper socket $f$, depending from and rotatably journaled by its tubular stem $f'$ on the head $d$ and provided with a circumferential friction-flange $f^2$, this socket being designed to receive the bottom of an inverted bottle G to be cleaned, and a lower annular socket $g$ on an arm $g'$, extending from the lower end of a sleeve $g^2$, slidably surrounding a guide-rod $e^2$, the lower socket alining with its companion upper socket $f$ to receive the neck of the bottle. On each sleeve $g^2$ are shown to be provided diverging arms $g^3$, carrying on their ends antifriction-wheels to engage a pair of the rods $e'$, and each sleeve also carries in a suitable bearing upon it an antifriction-wheel $g^4$, extending into the path of a cam-head H, surrounding the sleeve $a$ and adjustably fastened thereon, as by a set-screw $h$, to adapt it to be rigidly secured at any desired height on its supporting-sleeve. On the upper end of the cam-head H is rotatably mounted a spring-hanger H', (shown of general crown shape, Fig. 1,) adjustable with the cam, on which to suspend stiff coiled springs $H^2$, one for each socket $g$, which the spring carries by connecting the lower end of the latter with the respective sleeve $g^2$, as represented. The springs $H^2$ tend to draw the lower neck-sockets $g$ toward the respective base-sockets $f$ for clamping the bottles between them, and it is desirable to use the same springs on bottles of different lengths without varying the tension of the springs which effect the bottle-clamping. The cam H is set for each run of the machine on bottles of one length, (at least approximately,) the cam occupying a position which causes the sockets $g$ in the step-by-step rotation of the rack, produced as hereinafter described, to be depressed in succession at a given point on the under cam-face as the wheels $g^4$ reach that point to free the cleansed bottles and permit the insertion of others to be cleansed. In thus setting the cam the hanger H' is correspondingly raised or lowered and with it the several sockets $g$, whereby the tension of the socket-carrying springs remains unaffected. The adjusting means thus described forms one of the improvements hereinbefore referred to.

Another but relatively minor feature of improvement consists in providing a lip $i$ on each clamping-socket $g$ to flare upwardly and backwardly at the rear side of the same. This lip affords a guide-stop in inserting a bottle between coöperating clamping members $f$ and $g$ for preventing the operator, who is required to act quickly in adjusting a bottle in place, from setting it inclinedly with the mouth of the neck portion out of coincidence with the opening through its seating-socket $g$, and thus avoid obstruction to the action, hereinafter described, of the reciprocating brushes and rinser which enter the bottles through the said lower sockets and the bottle-necks seated therein.

Figure 3:
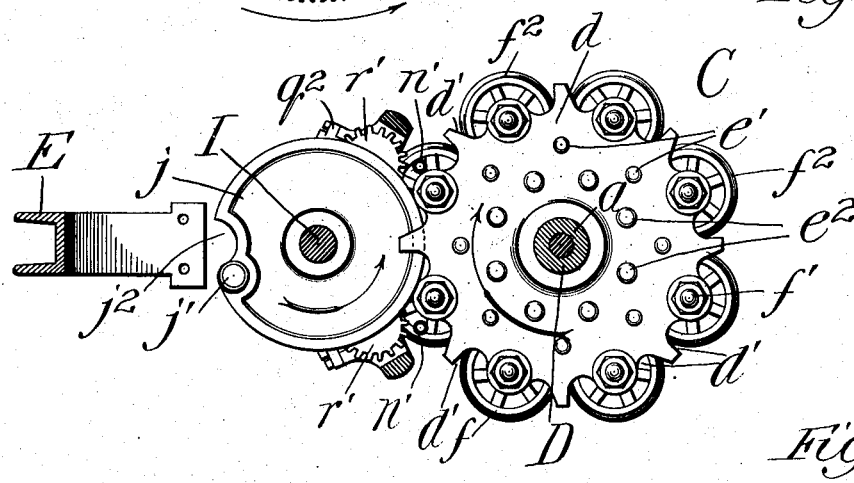
Figure 4:
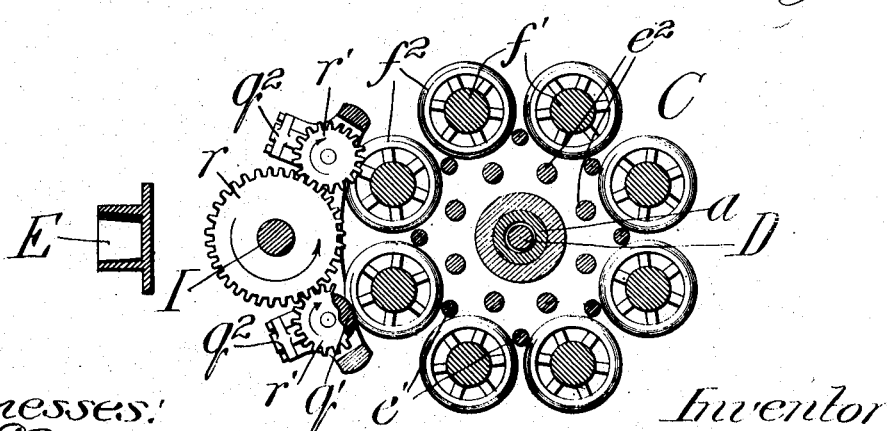

In the base of the bracket E and the frame member F is journaled a vertical shaft I, having secured upon it near its upper end adjacent to the head $d$ a horizontally-disposed disk $j$, carrying near its periphery a dog $j'$, Fig. 3, in the form of a roller adjacent to an arc-shaped recess $j^2$ in the periphery of the disk and adapted to engage in each revolution of the latter a notch $d'$ on the upper rack-head for imparting to the rack a stepby-step intermittent rotatory motion. The shaft also carries on its upper end a cog-wheel $k$ and is driven by engagement of the latter with a pinion $k'$, mounted on the shaft D. On the lower end of the shaft I is secured a cog-wheel $l$, having a crank-pin $l'$, Fig. 22, rotatably set into it from underneath near its perimeter. A pair of stationary vertical guide-rods A' extend between the base portion of the stand A and the pan B and serve to secure on the bottom of the latter a segment-shaped head B', serving a purpose hereinafter described. These guide-rods pass through a segment-shaped chambered cross-head K, Fig. 23, to permit the latter to be vertically reciprocated on them by rotation of the crank-gear $l$. To this end the cross-head is carried by links $m\ m$, fastened to it near its ends, extending thence upward and pivotally connected at their upper ends with the adjacent ends of arms of a cradle or frame $m'$, converging toward their connecting cross-bar $m^2$, the latter having arms $m^3$ extending from it to render the cradle of the nature of a bell-crank lever, and between the arms $m^3$ is adjustably confined and loosely to enable it to swing vertically and laterally one end of a crank-rod $m^4$, having its opposite end connected with the wrist-pin $l'$.

With the pivot-pin $m^5$, which connects the crank-rod with the cradle, a lever or valve handle $m^6$ is adjustably connected at a longitudinal slot therein, having its opposite end connected with the rotary stem of a valve $n$, supported on an extension of the frame and connected with a water-supply (not shown) through a pipe $n'$ and connected by a hose $n^2$ with a small chamber $o'$, Fig. 23, in one end of the hollow cross-head K, the center of the larger chamber $o$ in which has a hose connection $n^3$ with the hose $n^2$ through the medium of a valved head $n^4$. Thus as the shaft I rotates the gear $l$ its crank connection with the cradle rocks the latter and reciprocates the cross-head on its guide-rods A', and the movements of the cradle open and close the valve $n$ in each rotation of the said shaft to admit water into the cross-head near the end of its rise and shut off the supply while the cross-head is descending. The water-supply, through the hose $n^3$, may be shut off when desired through the medium of the valve in the head $n^4$.

L L are the brush devices for scouring the bottles internally, and their construction is most clearly illustrated in Figs. 25 to 28, inclusive. Three of these rotatable brush devices are provided, all of the same construction, so that description of one will suffice for all, and a fourth device L', Fig. 23, is also provided for merely rinsing the bottles in succession without brushing them internally, but may be of the same construction as the brush devices, except that it is unprovided with a brush.

From each of four points on the segmental head B', at which points coincident openings are provided through the head and the bottom of the pan B, there depends a short sleeve $B^2$, open at its inner side adjacent to the gear $b$ to permit the latter to mesh through said openings with pinions housed in said sleeves, as and for the purpose hereinafter described. In each sleeve $B^2$ is rotatably confined a short sleeve $p$, containing diametrically opposite feather-grooves, Fig. 25, and supported at its upper end by a flange $p'$ bearing against the surface of the pan-bottom, and on this short sleeve is fastened, within its surrounding sleeve $B^2$, a pinion $p^2$, meshing with the gear $b$. Within the sleeve $p$ is feathered to rotate with it, but reciprocate with independent longitudinal movement, a longer sleeve $p^3$, provided on its upper end with a head $p^4$, conforming to the shape of the bases of the clamp-sockets $g$. At points on the cross-head K coinciding, respectively, with the opening referred to in the head B' and pan B, three of said points being in the chamber $o$ and one in the chamber $o'$ of the cross-head, are rotatably confined at their headed lower ends, as shown in Fig. 24, vertical tubular spindles $p^5$, each passing through a sleeve $p^3$, in which it is feathered to rotate with it and with the sleeve $p$. A brush M is fastened at its stem to the upper end of each of the three hollow spindles $p^5$, which extend from the cross-head chamber $o$, while that extending from the chamber $o'$ need not be provided with any brush, being only used for rinsing.

The operation of the parts thus far described is as follows: With the cam H and spring-hanger H' adjusted for bottles G of a given length and the shaft D rotating, an attendant inserts the bottles, one at a time, between companion sockets $f$ and $g$, as the last-named socket is brought to a position at which the cam depresses it against the resistance of its controlling-spring $H^2$ to permit the insertion, and in advance of this point of insertion the cam has acted to depress that lower clamp-socket to free a previously-inserted bottle that has undergone the cleaning operation, while immediately after the insertion the cam permits the spring controlling the said lower socket containing the inserted bottle to recoil and clamp that bottle against the coöperating socket $f$. Rotation of the shaft D by its gear connection $k'\ k$ with the shaft I rotates the disk $j$ to engage in each revolution thereof, its dog $j'$ with a notch in the rack-head $d$, so that each rotation of the last-named shaft turns the rack one step, which brings a socket $g$ into alinement with a spindle $p^5$, and the recess $j^2$ enables the disk to clear the respective socket-stem $f'$, and the circumference of the disk serves to lock the rack by engagement with two such socket-stems. In the rotation of the rack the bottles encounter successively the rotating vertical surface-scrubbing brushes N, of which two are shown to be provided. Each brush N is journaled at its lower end in the pan and at its upper end in a bearing $q$, Fig. 1, and carries above the latter a grooved friction-pulley $q'$ in the path of the flanges $f^2$, forming friction-pulleys about the upper sockets $f$ for rotating the bottle in its encounter with a brush N by engagement of these two friction-pulleys under rotation of said brush, the constant rotation of the scrubbing-brushes being produced by a pinion $r'$ on the upper journaling end of each meshing with a cog-wheel $r$, secured on the shaft I. Each pinion $r'$ is journaled in a spring-pressed bearing $q^2$, Fig. 4, of known construction, tending to throw the pulley $q'$ inward into the path of the socket-flanges $f^2$ to augment their frictional contact with said pulley $q'$ and insure rotation of the bottles as they encounter the rotating brushes N for presenting thereto their entire surfaces between the clamping-sockets. Rotation of the shaft I by revolving the crank-gear $l$ also rocks the cradle $m'$ through the medium of the rod $m^4$ and reciprocates the cross-head K, raising and lowering it in each stoppage of the rack C, at which the spindles $p^5$, while rapidly rotating under the actions of the gears $b$ $p^2$ to centrifugally spread the brushes M on those of the spindles equipped with them, enter the bottle-necks brought coincident with them in the respective sockets $g$ and are withdrawn before the rack is again moved a step. The operating parts are so timed that while the rotating hollow spindles $p^5$ are rising and descending within the respective bottles the relative movements of the cradle $m'$ open and hold open the valve $n$ to admit water into the cross-head chambers to supply therewith the spindles, through which the water enters the bottles to be scrubbed by the brushes M on three of the spindles and the advanced previously-scrubbed bottle to be rinsed by spraying the water from the spindle unprovided with a brush.

In the rise of a brush-spindle $p^5$ the sleeve $p^3$ should rise correspondingly until its head $p^4$ encounters and is arrested by the coincident clamp-socket $g$ and remain snugly in that position while the internal bottle scrubbing or rinsing procedure continues. Upon the sleeve $p^3$ reaching that encountering position the continued rise of the cross-head K advances the respective spindle $p^5$ into the bottle through the clamp-socket and bottle-neck, the centrifugal action spreading the brush M to enhance its scrubbing action, (or spraying the water out of the upper end of the rinsing-spindle unprovided with a brush.) The downward movement of the cross-head carries with it the brush-spindle without disturbing the sleeve $p^3$ until the brush M on the spindle in the descent of the latter enters the upper end of the sleeve, in attaining which condition it is of course compacted. The brush should not be unhoused by advancing it beyond the sleeve until the latter encounters its seat in the clamp-socket $g$, else the centrifugal action upon the brush of its rotating spindle will spread it before it can enter the bottle-neck with the effect of obstructing its entrance into the latter and the result of a tendency to impair it or fracture the neck, or both. To prevent such result, positive raising means are provided for the sleeve $p^3$ about each brush-equipped spindle, and such means form another improvement and involve the following-described construction.

Perforated guide-ears $s$ and $s'$, Fig. 23, are shown projecting from the end portions of the cross-head K. A vertical reciprocable rod K' passes through the ear $s$ and carries a stop-button $t$ near its lower end and a similar button $t'$ on its upper end, Fig. 27, and near the upper end another button $t^2$. Rising from the bottom of the pan B are two similar hollow posts $u$ $u$, each containing a vertical slot $u'$ and forming a guide for a sleeve $v$, reciprocably surrounding it and provided with an arm $v'$, extending at a right angle from its lower end and having an opening in its end portion, at which it surrounds a headed sleeve $p^3$. Within each post extends a coiled spring $w$, fastened at its upper end in the post and at its lower end to a stud $w'$ projecting from the sleeve $v$ through the slot $u'$. From the upper end of one sleeve $v$ projects laterally an arm $x$, through which the rod K' passes, this arm being in position to be engaged by the button $t'$, and from the lower end of the other sleeve $v$ projects a similar guide-arm $x'$ for the rod in position to be engaged by the button $t^2$ on the latter. The spring-pressed sleeves $v$ are provided thus in duplicate to enable both to be actuated through the medium of a rod K', and they coöperate, respectively, with the sleeves $p^3$ of the two brush devices L, one of which is at the outer end of the cross-head chamber $o$ and the other of which is near the center of that chamber. The third brush device L is, as will be understood, equipped with a rod $K^2$ passing through the ear $s'$ and carrying a stop-button like and in the relative position of the buttons $t$ and $t^2$, the latter to engage a guide-arm extending from a spring-pressed sleeve to surround a brush-spindle sleeve $p^3$ and a post-support rising from the pan-bottom. Thus the spring-pressed sleeve device for the third brush device is like the two devices for the same purpose illustrated in detail, and the purpose of each is to raise and hold the sleeve $p^3$ controlled by it while the brush device is performing its scrubbing function. In accomplishing this purpose the operation is as follows:

With the parts in their relative positions represented in Figs. 26 to 28 the cross-head K is at or near the end of its upstroke and has raised the brush-spindles $p^5$ accordingly, and their rise has been accompanied by that of the sleeves $v$ under the recoil action of their controlling-springs $w$, until the heads $p^4$ encountered the sockets $g$, whereupon the continued rise of the cross-head forced the rotating spindles with their brush ends out of the arrested sleeves into the respective bottles. The springs $w$ hold the sleeves $p^3$ against the sockets $g$ until, by the descent of the cross-head, the brush-spindles are so far withdrawn from the bottles as to introduce the brushes M into the sleeves $p^3$, when the ears on the cross-head encounter the buttons $t$ on the rods K' K². The further descent of the cross-head by the engagement of the other stops on the rods with the sleeves $v$ draws the latter downward against the resistance of their controlling-springs $w$, and the gravity of the sleeves $p^3$, supplemented by the friction against them of the descending spindles $p^5$, lowers the said sleeves to their lowermost position against or near the flanges $p'$, ready to be again raised with the return stroke of the cross-head by the accompanying recoil action of the springs $w$. The described duplication for two of the brush devices L affords the advantage of economy in construction by saving one rod; but such duplication is not essential to my invention. However, the use of such duplication makes it important that the twin sleeves $v$ shall be independently movable under the action of the stop-buttons $t'$ $t^2$ on the rod K' to compensate for variations, more or less slight, in the lengths of the necks of bottles operated upon in the same run. Thus if a longer bottle-neck be encountered by the arm $v'$ on either sleeve $v$ such encounter will not prevent the other arm $v'$ from rising far enough to encounter the clamp-socket $g$, seating a shorter bottle-neck, whereas if the twin sleeves were joined rigidly together to prevent their independent movement under the recoil action of their controlling-springs the encounter by one arm $v'$ of a socket $g$, seating a longer bottle-neck, would arrest the other arm $v'$ short of the socket seating the shorter bottle-neck, and accordingly tend to prevent the respective sleeve $p^3$ from reaching its operative position, with the result that the respective brush M would emerge from its housing in its sleeve $p^3$ and spread before entering the socket $g$ and bottle-neck therein.

The improvement involving means for automatically delivering the cleansed bottles from the washer is fully illustrated in Figs. 5 to 21, inclusive.

An idler-gear $l^2$, like the gear $l$, meshes therewith and with a similar gear $l^3$ on the lower end of a vertical shaft I'. The shaft I' drives, with a step-by-step motion corresponding with that of the rack C, an endless horizontal bottle-conveyer O, provided with a series of downwardly-tapering bottomless rubber-lined cups P, forming holders to receive the bottles in succession, neck downward, with their necks projecting through the cups to permit the bottles to drain. The conveyer has a rigid frame shown formed with two alining central supporting-legs 1 and 2, composed of channel-bars, each having a bracket 3 bolted to its face near the upper end of the leg, the bracket containing a longitudinal slot 4 in its horizontal portion, Fig. 18, and to the face of each leg is bolted to extend horizontally across it an angle-bar 5, to the ends of which are fastened angle-bar 6 6, extending parallel with the respective central leg, each pair of these legs 6 being braced in any suitable manner, though no braces are shown. On the legs 6, near their upper ends, is supported a flat endless oblong outer guide-track 7, and angle-irons 8 8 join the legs 1 and 2 at their outer sides to form an inner horizontal guide-track for an endless chain 9. The chain passes about sprockets 10 and 11, each journaled on a stud like the stud 12, (shown in Fig. 18,) having a lower extension 13 movably confined in a longitudinal bracket-slot 4 and held by a set-screw 14, having its bearing in the outer end of the bracket. Thus each sprocket may be adjusted lengthwise of the respective slot 4 for taking up slack in the chain. The cups P are fastened at their inner sides at equal intervals apart to the endless chain to ride between the two tracks and are provided with outwardly-projecting arms 15, extending upon the outer track to afford to them bearing thereon and support them.

A crank-arm 16 is provided underneath the gear $l^3$ on the shaft I' to rotate with it and has journaled in its outer end one end of a plunger-rod Q, the opposite end of which is adjustably connected with a tubular bearing 17, Fig. 21, on a sleeve 18, rotatably confined about a stem 19, depending from a loop 20, slidably mounted upon a horizontal bar 21, which is bolted at its ends to the angular track-bar 8 at one side of the longitudinal center of the conveyer to extend underneath and parallel with it, the bolts extending through washers 22, which produce a space between the two bars wherein to enable the loop 20 to move. On the loop is formed a vertical sleeve 23, in which is journaled a pin 24, carrying on its upper end a dog 25, that projects into the path of the chain 9 and is held resiliently therein by a spring 26, coiled about the pin with one end engaging the dog and the other end held by the loop. By the construction thus described each time the rack C is turned one step the plunger-rod Q actuates the dog 25 against a link of the conveyer-chain to move the series of cups P a step. By adjusting the dog 25 to lengthen or shorten the distance between the crank 16 and sleeve-bearing 18 the throw of the dog, and consequently the extent of movement of the chain, may be regulated accordingly.

Each movement of the conveyer brings adjacent to the bottle G, acted upon by the rinser device L', which is the final operation of the washer in each complete rotation of the rack C, a cup P into position to receive that bottle, and means are provided for automatically taking the bottle from the rack and depositing it in the cup, said means consisting of a cam-actuated gripper device involving the following-described construction.

A cam-head 27 has formed about it a cam-groove provided on its bottom with a cam-surface 28, like that shown by the projected view in Fig. 9. On the head 27 is journaled at its center on the upper end of the shaft I' a disk 29, Fig. 17, provided with a diametrical guide-channel 30, terminating at one end in a peripheral recess 31 in the disk and containing a reciprocable bar 32, carrying on its end at the recess an antifriction-roller 33, Fig. 13, working in the cam-groove. The head 27 is fastened to an extension 34 of the pan B, Fig. 10, in which the shaft I', surrounded by a sleeve 35, is journaled. The cam-head is provided with a tailpiece 36, containing an elongated slot 37, Fig. 8, in its end for an adjusting purpose hereinafter explained.

R is the bottle-transferring gripper. On one end of a bar 38 are pivoted gripper-jaws 39 39, provided with faces 40 40 of soft rubber, and connected by a spiral spring 41, and on the rear ends of the jaws are fingers 42 42, curvedly diverging toward their ends to admit between them the roller-equipped end of a plunger-bar 43 for spreading apart the jaws. The plunger 43 is confined on the top of the bar 38 to reciprocate longitudinally thereon by a pin 44 on the bar 38, passing through a longitudinal slot 45, Fig. 14, in the plunger and has its rear end connected with the short arm of a bell-crank lever 46, fulcrumed through its angle at y to the bar 38 and having its fulcrum-pin connected by a spiral spring 47 with a stud 48 on the plunger 43. The longer arm of the bell-crank carries on its end an antifriction-roller 49, engaging the cam end of a plate 50. The cam-plate 50 forms the cover of a shoe 51, Fig. 11, through which the bar 38 reciprocates and is adjustably secured on the shoe, as represented in Fig. 6, to adapt the cam to be set relative to the end of the bell-crank 46, which engages it. The base of the shoe 51 carries transversely a boss 52, containing a longitudinal bore in which is journaled a pin 53, extending from a vertically-bored head 54, journaled on a pin 55, passing through and adjustably fastened in the slot 37, which is provided in the tailpiece 36 of the cam-head 27 to permit the stroke of the bar 38 to be regulated. On the bar 38, near the disk 29, is fastened a clip 56, formed with a laterally-projecting ear 57, containing a vertical slot 58, and this slot fits over the correspondingly-shaped head 59 of a pin 60, Fig. 16, the cylindrical stem of which passes through the roller 33 in the cam-groove of the head 27, thereby connecting the gripper R with the disk 29.

The bottle-transferring gripper and conveyer mechanisms coöperate with the rack C as follows: The movements of the rack are so timed relative to the actuation of the conveyer O that in bringing a bottle to the position to be acted on by the rinsing device L' partial rotation of the shaft I' will, through the medium of the crank 16, drive the plunger-rod Q to force the dog 25 against a link of the chain 9 and move the latter accordingly to advance a cup P into its position adjacent to the said bottle to receive the latter under the transfer action of the gripper device R, and the further turning of the shaft in completing its rotation will retract the dog into position behind another chain-link ready to act against the same in the next rotation of the shaft I'. Such rotation, furthermore, revolves the disk 29, carrying the roller 33 about in the groove of the cam-head 27 and reciprocating the slide-bar 32 in the guide-channel 30, contained in the disk. This reciprocation of the bar 32 communicates reciprocating movement to the gripper-bar 38, the movements of which are so timed that when it is retracted to the position represented in Fig. 7 the cam 50 is engaged by the bell-crank 46 to turn the latter and cause the shorter arm thereof to advance the plunger-bar 43 in opposition to the spring 47 between the fingers 42 and spread apart the jaws 39 to prepare them to receive the rinsed bottle between them, and when the bar 38 is advanced to the position represented in Fig. 6, thereby riding the bell-crank 46 in the opposite direction against the cam 50, the recoil force of the resultantly-released spring 47 retracts the plunger 43 from between the jaw-fingers 42 and permits the jaws to be brought together under the force of their connecting-spring 41 to grip the respective bottle. In performing its function the gripper device turns horizontally on the vertical axis 55 to bring the jaws in their open condition to the position represented in Fig. 6, where the jaws close about the bottle when the gripper turns on the horizontal axis 53 to lower the bottle out of the socket f to clear the latter, and thereupon turn on the vertical axis to bring the jaws carrying the bottle to the position represented in Fig. 7, wherein the bottle is supported directly over a cup P, and the retractive movement of the bar 38 opens the jaws to release the bottle, which drops into the respective cup neck downward. The illustrated shape of the cam-groove in the head 27 is such as to cause the movements it produces of the reciprocating slide-bar 32 to reciprocate the gripper-bar 38, swing it horizontally, and cause the jaws to open and close, and that of the cam-base 28 of the said head, on which the pin-stem 60 rides, effects rocking of the arm 38 on the fulcrum 53 to lower the bottle clear of obstruction at its base end from the socket $f$ containing it preparatory to transferring the bottle to the conveyer. In this manner the cleansed bottles are transferred successively to cups P, advanced stepwise in succession into position to receive them and permit them to drain through the open bottoms of the cups in the travel of the conveyer. An attendant removes the bottles from the conveyer-cups as they successively attain the position at which the attendant is stationed.

What I claim as new, and desire to secure by Letters Patent, is—

1. In a bottle-washing machine, bottle-washing mechanism including movable bottle-clamps, a conveyer for the washed bottles leading from said mechanism, and means operating automatically to grip the washed bottles and transfer them from said clamps to the holders of the conveyer.

2. In a bottle-washing machine, bottle-washing mechanism including intermittently-movable bottle-clamps, an endless conveyer for the washed bottles leading from said mechanism, and means operating automatically to grip the washed bottles and transfer them from said clamps to the holders of the conveyer.

3. In a bottle-washing machine, bottle-washing mechanism including movable bottle-holders, automatic bottle gripping and transferring means, a conveyer receiving the washed bottles from said transferring means, and power-transmitting means between said mechanism and conveyer.

4. In a bottle-washer of the character described, the lower spring-pressed socket member of a bottle-clamp on the rotatory bottle-rack, having rising from it a stop-lip for the bottle-neck.

5. In a bottle-washer of the character described, the rotatory bottle-rack comprising, in combination, connected heads, the upper head being provided with sockets for receiving the bottoms of the bottles, cam-actuated spring-pressed bottle-sockets between said heads adapted to support the necks of bottles and apertured for the passage of bottle-washing brushes, a vertically-reciprocating cross-head, tubular brush-equipped spindles carried by said cross-head to enter the bottles, headed sleeves surrounding and reciprocating with said spindles to engage the lower sockets, and spring-pressed supports for said sleeves reciprocating therewith, for the purpose set forth.

6. In a bottle-washer of the character described, the rotatory bottle-rack comprising, in combination, connected heads the upper head being provided with sockets for receiving the bottoms of the bottles, cam-actuated spring-pressed bottle-sockets between said heads adapted to support the necks of bottles and apertured for the passage of bottle-washing brushes, a vertically-reciprocating cross-head, tubular brush-equipped spindles carried by said cross-head to enter the bottles, headed sleeves surrounding and reciprocating with said spindles to engage the lower sockets, and means for supporting a sleeve in such engagement, consisting of a vertical post, an arm spring-suspended on said post and through which the sleeve passes, and a rod depending from said sleeve and provided with a stop to be engaged by said cross-head in its downstroke.

7. In a bottle-washer of the character described, the rotatory bottle-rack comprising, in combination, connected heads the upper head being provided with sockets for receiving the bottoms of the bottles, cam-actuated spring-pressed bottle-sockets between said heads adapted to support the necks of bottles and apertured for the passage of bottle-washing brushes, a vertically-reciprocating cross-head, tubular brush-equipped spindles carried by said cross-head to enter the bottles, headed sleeves surrounding and reciprocating with said spindles for engaging the lower sockets, and means for supporting a headed sleeve in such engagement, consisting of a vertical tubular slotted post, a sleeve surrounding said post and from which a guide-stud projects into the post-slot, said sleeve having an arm extending from it through which said headed sleeve passes, a spring in said post and suspending said sleeve thereon at said stud, and a vertically reciprocable rod engaging the post-sleeve and provided near its lower end with a button in the path of said cross-head.

8. In a bottle-washer of the character described, the rotatory rack equipped with means for washing bottles and having upper rotatable bottle-sockets, guide-rods extending between the rack-heads, lower bottle-sockets on sleeves vertically movable on said rods and provided with cam-bearings, a cam supported to extend in the path of said bearings and vertically adjustable on its support, a vertically-adjustable head on said cam-support, and springs on which said lower sockets are suspended from said head, for the purpose set forth.

9. In a bottle-washer of the character described, a rotatory rack equipped with means for washing bottles and having upper rotatable bottle-sockets, guide-rods extending between the rack-heads, lower bottle-sockets on sleeves vertically movable on said rods and provided with cam-bearings, a cam supported to extend in the path of said bearings and vertically adjustable on its support, a head rotatably mounted on said cam, and coiled springs connecting said lower sockets with said head, for the purpose set forth.

10. In a bottle-washing machine, bottle-washing mechanism, driving means therefor, and a cam-actuated bottle-gripping device receiving the bottles from said mechanism and comprising spring-closed jaws, a reciprocably-supported bar on which said jaws are mounted, provided with means for opening the jaws, a cam, and means engaging said cam and geared to said driving means to reciprocate said bar.

11. In a bottle-washing machine, bottle-washing mechanism, driving means therefor, and a bottle-gripping device receiving the bottles from said mechanism and comprising spring-closed jaws, a reciprocably-supported bar on which said jaws are mounted, carrying a reciprocable spring-retracted plunger for opening said jaws, a cam, and means engaging said cam and geared to said driving means to reciprocate said bar.

12. In a bottle-washing machine, bottle-washing mechanism, driving means therefor, a stationary cam-head, a rotary disk geared to said driving means, a bar reciprocally mounted on said disk and carrying a roller engaging said head, bottle-gripping spring-closed jaws receiving the bottles from said mechanism, and a reciprocally-supported bar on which said jaws are mounted, pivotally connected with said roller and provided with means for opening the jaws.

13. In a bottle-washing machine, bottle-washing mechanism, driving means therefor, a stationary cam-head, a rotary disk geared to said driving means, a bar reciprocably mounted on said disk and equipped with a roller engaging said head, bottle-gripping spring-closed jaws receiving the bottles from said mechanism, a reciprocably-supported bar on which said jaws are mounted, pivotally connected with said roller, and a spring-retracted plunger mounted on said last-named bar for opening said jaws.

14. In a bottle-washing machine, bottle-washing mechanism, driving means therefor, a stationary cam-head, a rotary disk geared to said driving means, a bar reciprocably mounted on said disk and equipped with a roller engaging said head, bottle-gripping spring-closed jaws receiving the bottles from said mechanism, a reciprocably-supported bar on which said jaws are mounted, pivotally connected with said roller, a plunger for opening the jaws mounted on the last-named bar, and a bell-crank lever mounted on the same and having one arm connected with the plunger, a retracting-spring connecting said plunger with its supporting-bar and a cam in the path of the other arm of the bell-crank lever.

15. In a bottle-washing machine, bottle-washing mechanism, driving means therefor, a stationary head having a cam-groove formed about it and a cam-bottom, a rotary disk geared to said driving means, a bar reciprocably mounted on said disk and equipped with a roller traveling in said groove, bottle-gripping spring-closed jaws receiving the bottles from said mechanism, a reciprocably-supported bar on which said jaws are mounted, connected with said jaws by a pivot-pin passing through it into engagement with said cam-bottom, a guide-shoe through which said jaw-carrying bar works, having pivotal connections, at right angles to each other, with a support, and means on said jaw-carrying bar for opening the jaws.

16. In a bottle-washing machine, bottle-washing mechanism, driving means therefor, a stationary head having a cam-groove formed about it and a cam-bottom, a rotary disk geared to said driving means, a bar reciprocably mounted on said disk and equipped with a roller traveling in said groove, bottle-gripping spring-closed jaws receiving the bottles from said mechanism, a reciprocably-supported bar on which said jaws are mounted connected with said jaws by a pivot-pin passing through it into engagement with said cam-bottom, a spring-retracted plunger confined on said jaw-carrying bar for opening said jaws, a bell-crank fulcrumed on said last-named bar with one arm connected with said plunger, a guide-shoe through which said jaw-carrying bar works, having pivotal connections at right angles to each other, with a support, and a cam on said last-named bar engaged by the other bell-crank arm.

JOHN T. H. PAUL.

In presence of—
  A. U. THORIEN,
  J. H. LANDES.